United States Patent
Granfors

(12) 
(10) Patent No.: US 6,721,441 B1
(45) Date of Patent: Apr. 13, 2004

(54) EXTENDED DYNAMIC RANGE SYSTEM FOR DIGITAL X-RAY IMAGING DETECTORS

(75) Inventor: Paul R. Granfors, Sunnyvale, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/475,872

(22) Filed: Dec. 30, 1999

(51) Int. Cl.$^7$ .................................................. G06K 9/00
(52) U.S. Cl. ...................................... 382/132; 382/128
(58) Field of Search .............................. 382/128, 132, 382/270; 378/62

(56) References Cited

U.S. PATENT DOCUMENTS

| | | | |
|---|---|---|---|
| 5,357,549 A | 10/1994 | Maack et al. | 378/62 |
| 5,454,044 A * | 9/1995 | Nakajima | 382/132 |
| 5,454,053 A * | 9/1995 | Okubo et al. | 382/270 |
| 5,493,622 A * | 2/1996 | Tsuchino et al. | 382/132 |
| 5,550,888 A | 8/1996 | Neitzel et al. | 378/98.7 |
| 5,835,618 A | 11/1998 | Fang et al. | 382/132 |

* cited by examiner

*Primary Examiner*—Leo Boudreau
*Assistant Examiner*—Tom Y Lu
(74) *Attorney, Agent, or Firm*—Fletcher Yoder

(57) ABSTRACT

A technique for adjusting the dynamic range in an imaging system includes balancing of pure gray level processing with pure frequency processing to reduce the brightness of light regions in an image and to maintain contrast in darker regions. The technique applies unsharp masking in which a set of parameter values are used based upon smoothed pixel values for an image. The unsharp masking parameters may be substantially zero below a threshold, and increase non-linearly above the threshold. A set of brightness control parameters are then used to adjust an output value for each pixel to a desired dynamic range. The brightness control parameters may also be nonlinear.

38 Claims, 3 Drawing Sheets

EXTENDED DYNAMIC RANGE SYSTEM FOR DIGITAL X-RAY IMAGING DETECTORS

FIELD OF THE INVENTION

The present invention relates generally to the field of digital imaging systems, such as x-rays systems employing digital detectors. More particularly, the invention relates to a technique for enhancing the dynamic range of a digital detector arrangement in an x-ray imaging system to provide uniform and useful image data of various tissues and patient morphologies.

BACKGROUND OF THE INVENTION

Digital imaging systems have become increasingly important in a number of fields, particularly in the medial diagnostic field, and are often preferred over conventional techniques. For x-ray imaging, for example, conventional systems employ photographic film which is exposed during an x-ray examination, with contrast and details in the resulting image being provided by the various levels of absorption of the x-ray radiation passing through the patient. For example, bones and other similar tissues appear bright in the resulting photographic image, whereas soft tissues, such as the lungs appear darker. Challenges exist in balancing the parameters of exposure to provide the most useful resulting image, typically contrasting those features of particular interest. Similar challenges are presented in digital imaging systems.

In current digital x-ray imaging systems, radiation from a source is directed toward a subject, typically a patient in a medical diagnostic application. A portion of the radiation passes through the patient and impacts a detector. The surface of the detector converts the radiation to light photons which are sensed. The detector is divided into a matrix of discrete picture elements or pixels, and encodes output signals based upon the quantity or intensity of the radiation impacting each pixel region. Because the radiation intensity is altered as the radiation passes through the patient, the images reconstructed based upon the output signals provide a projection of the patient's tissues similar to those available through conventional photographic film techniques.

Digital x-ray imaging systems are particularly useful due to their ability to collect digital data which can be reconstructed into the images required by radiologists and diagnosing physicians, and stored digitally or archived until needed. In conventional film-based radiography techniques, actual films were prepared, exposed, developed and stored for use by the radiologist. While the films provide an excellent diagnostic tool, particularly due to their ability to capture significant anatomical detail, they are inherently difficult to transmit between locations, such as from an imaging facility or department to various physician locations. The digital data produced by direct digital x-ray systems, on the other hand, can be processed and enhanced, stored, transmitted via networks, and used to reconstruct images which can be displayed on monitors and other soft copy displays at any desired location. Similar advantages are offered by digitizing systems which convert conventional radiographic images from film to digital data.

Despite their utility in capturing, storing and transmitting image data, digital x-ray systems are still overcoming a number of challenges. For example, while film-based systems make use of light boxes or similar back lighting for viewing of the images, digital images are more often viewed on computer monitors or similar displays, which can suffer from a tendency to saturate regions of a reconstructed image, either by reproducing the regions as too bright or too dark. The underlying problem in such images may be rooted in the dynamic range of the image data, which may be mismatched to the dynamic range of an output device. Extended dynamic range techniques have been developed and implemented in an analog domain, such as in conventional image intensifiers and pickup tube systems. However, these same techniques are not easy to implement in the digital domain for use in displaying digital x-ray images.

The difficulty in systems employing digital imaging detectors stems from the digital dynamic range of the various components of the system. In particular, the dynamic range of the digital detector may be different from that of a display or output device. Thus, the dynamic range of the image data provided by the detector may need to be adapted to that of the output device. In one present system, for example, each pixel may be encoded in the data acquisition circuitry by 12 bits of data. A display device, however, may have a different dynamic range, typically reduced from the 12 bit range in the present example. In one presently available system, soft copy displays, such as computer monitors, are capable of providing a useful dynamic range of only 8 bits. Depending upon the type of image, the anatomy or tissues viewable in the image, and similar factors, improper adjustment of the dynamic range can result in loss of desired contrast, reducing the ability to distinguish features in certain areas (e.g., at a lower end of the dynamic range). Saturation of other regions of the image may also occur, with similar loss of detail in those regions (e.g., at an upper end of the dynamic range). Such problems have, been encountered particularly in chest x-rays, in which improper dynamic range adjustment can result in loss of contrast in regions of the heart, while producing saturation in lung regions of the reconstructed image.

There is a need therefore, for an improved technique for extending the useful dynamic range of a digital imaging system, particularly of an x-ray system employing a digital detector. Moreover, a present need exists for an improved system which can be implemented through programmable filtering to adapt the dynamic range applied to specific regions of an image to provide useful image data through contrast enhancement in the regions, while avoiding producing low contrast in darker regions or saturation in lighter regions. There is a particular need for a straightforward technique for adjusting the dynamic range of acquired image data so as to avoid loss of contrast and saturation of regions in a reconstructed image on an output device with a different dynamic range.

SUMMARY OF THE INVENTION

The invention provides a dynamic range extension technique adapted for use in digital imaging systems, and particularly in x-ray systems. The technique may be implemented via appropriate programming of signal processing or digital filtering components of the system, based upon input data collected from a digital detector. The technique may thus be implemented on existing systems, such as through software retrofits, as well as to new systems where the extended dynamic range is desirable. While the technique is particularly well suited to direct digital x-ray imaging systems, it may also find application in similar fields, such as in the display of images encoded from conventional supports, such as photographic film. Even more generally, the technique may find application in fields outside of x-ray imaging, and outside of the field of medical diagnostic imaging.

The technique employs a balance between pure gray level processing and pure frequency processing. Parameters employed for converting input data to output data thus balance a tendency to overlimit contrast through pure gray level processing, with a tendency to produce "ringing" artifacts through pure frequency processing. The parameters may exhibit nonlinearities by which they vary over an input range as a function of the input signal value, and desired thresholds in the input signal values. By applying both the gray level processing control parameters and the frequency processing control parameters over the range of input values, the resulting dynamic range is extended to provide good contrast in darker regions of the resulting image, while avoid saturation of brighter regions.

In general, the technique permits processing to decrease individual pixel values or intensities in bright portions of a reconstructed image, while maintaining some level of detail in these regions. The original image data may thus be adjusted from a first dynamic range, such as a 12 bit dynamic range, to a desired range, such as an 8 bit range of a display. Contrast in darker regions of the image, such as in heart regions of a chest x-ray is therefore preserved, while saturation of the brighter portions of the image, such as in details of the lungs is avoided.

DETAILED DESCRIPTION OF THE INVENTION

Figure 1:
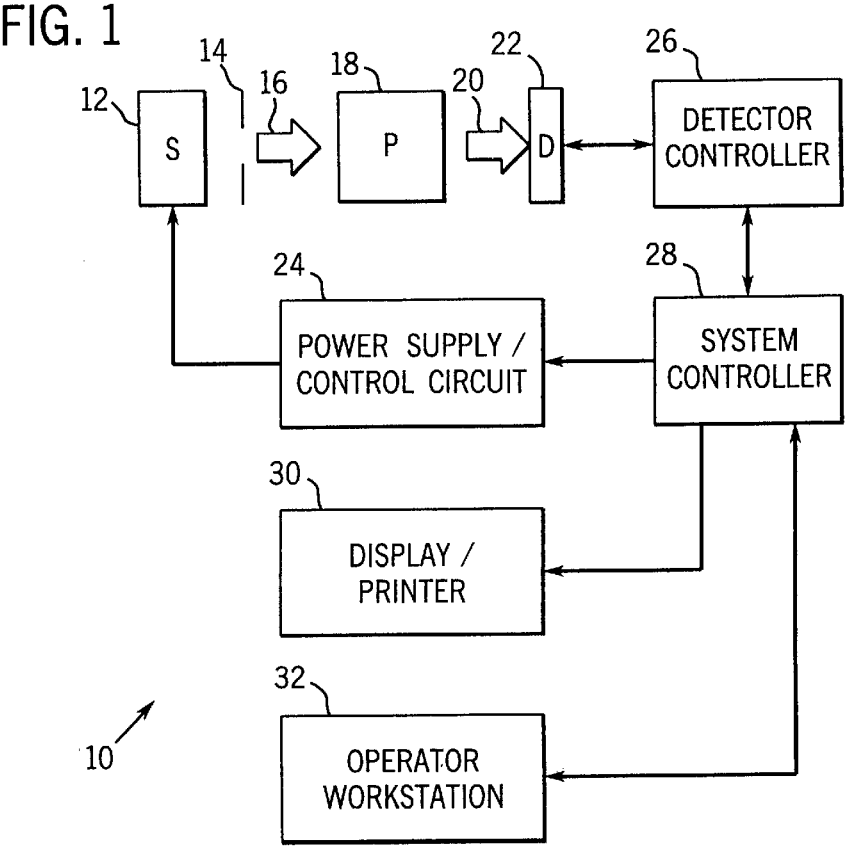
FIG. 1 is a diagrammatical overview of a digital x-ray imaging system in which the present technique is incorporated.

FIG. 1 illustrates diagrammatically an imaging system for acquiring and processing discrete pixel image data. In the illustrated embodiment, system is a digital x-ray system designed both to acquire original image data, and to process the image data for display in accordance with the present technique. Throughout the following discussion, however, while basic and background information is provided on the digital x-ray system, it should be borne in mind that aspects of the present technique may be applied to other types of systems, as well as to systems in which original image data sets are acquired by digitization of existing images. Similarly, aspects of the present technique may be applied to viewing stations designed to receive or access image data acquired and stored separately from the viewing station.

In the embodiment illustrated in FIG. 1, imaging system 10 includes a source of x-ray radiation 12 positioned adjacent to a collimator 14. Collimator 14 permits a stream of radiation 16 to pass into a region in which a subject, such as a human patient 18 is positioned. A portion of the radiation 20 passes through or around the subject and impacts a digital x-ray detector, represented generally at reference numeral 22. As described more fully below, detector 22 converts the x-ray photons received on its surface to lower energy photons, and subsequently to electric signals which are acquired and processed to reconstruct an image of the features within the subject.

Source 12 is controlled by a power supply/control circuit 24 which furnishes both power and control signals for examination sequences. Moreover, detector 22 is coupled to a detector controller 26 which commands acquisition of the signals generated in the detector. Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. In the present context, system controller 28 also includes signal processing circuitry, typically based upon a general purpose or application-specific digital computer, associated memory circuitry for storing programs and routines executed by the computer, as well as configuration parameters and image data, interface circuits, and so forth. In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
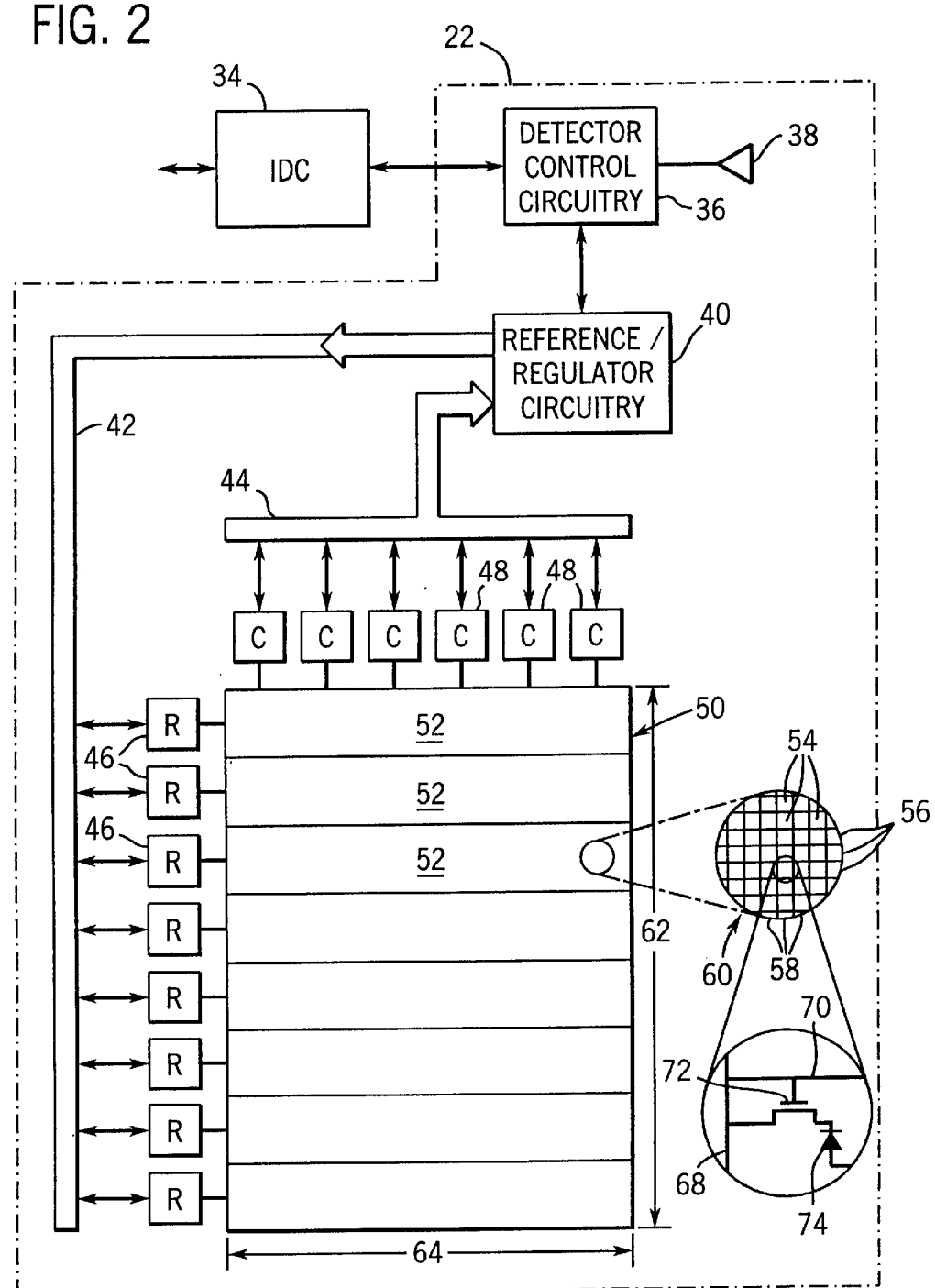
FIG. 2 is a diagrammatical representation of certain of the functional circuitry for producing image data in a detector of the system of FIG. 1 to produce image data for reconstruction.

FIG. 2 is a diagrammatical representation of functional components of digital detector 22. FIG. 2 also represents an imaging detector controller or IDC 34 which will typically be configured within detector controller 26. EDC 34 includes a CPU or digital signal processor, as well as memory circuits for commanding acquisition of sensed signals from the detector. IDC 34 is coupled via two-way fiberoptic conductors to detector control circuitry 36 within detector 22. IDC 34 thereby exchanges command signals for image data within the detector during operation.

Detector control circuitry 36 receives DC power from a power source, represented generally at reference numeral 38. Detector control circuitry 36 is configured to originate timing and control commands for row and column drivers used to transmit signals during data acquisition phases of operation of the system. Circuitry 36 therefore transmits power and control signals to reference/regulator circuitry 40, and receives digital image pixel data from circuitry 40.

In a presently preferred embodiment illustrated, detector 22 consists of a scintillator that converts x-ray photons received on the detector surface during examinations to lower energy (light) photons. An array of photodetectors then converts the light photons to electrical signals which are representative of the number of photons or the intensity of radiation impacting individual pixel regions of the detector surface. As described below, readout electronics convert the resulting analog signals to digital values that can be processed, stored, and displayed, such as in a display 30 or a workstation 32 following reconstruction of the image. In a presently preferred embodiment, the array of photodetectors is formed on a single base of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics described below. The drains of the transistors in a column are connected together and an electrode of each column is connected to readout electronics.

In the particular embodiment illustrated in FIG. 2, by way of example, a row bus 42 includes a plurality of conductors for enabling readout from various columns of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector.

In the illustrated embodiment, row drivers 46 and readout electronics 48 are coupled to a detector panel 50 which may be subdivided into a plurality of sections 52. Each section 52 is coupled to one of the row drivers 46, and includes a number of rows. Similarly, each column driver 48 is coupled to a series of columns. The photodiode and thin film transistor arrangement mentioned above thereby define a series of pixels or discrete picture elements 54 which are arranged in rows 56 and columns 58. The rows and columns define an image matrix 60, having a height 62 and a width 64.

As also illustrated in FIG. 2, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode may be accessed via readout electronics 48, and converted to digital signals for subsequent processing and image reconstruction.

Figure 3:
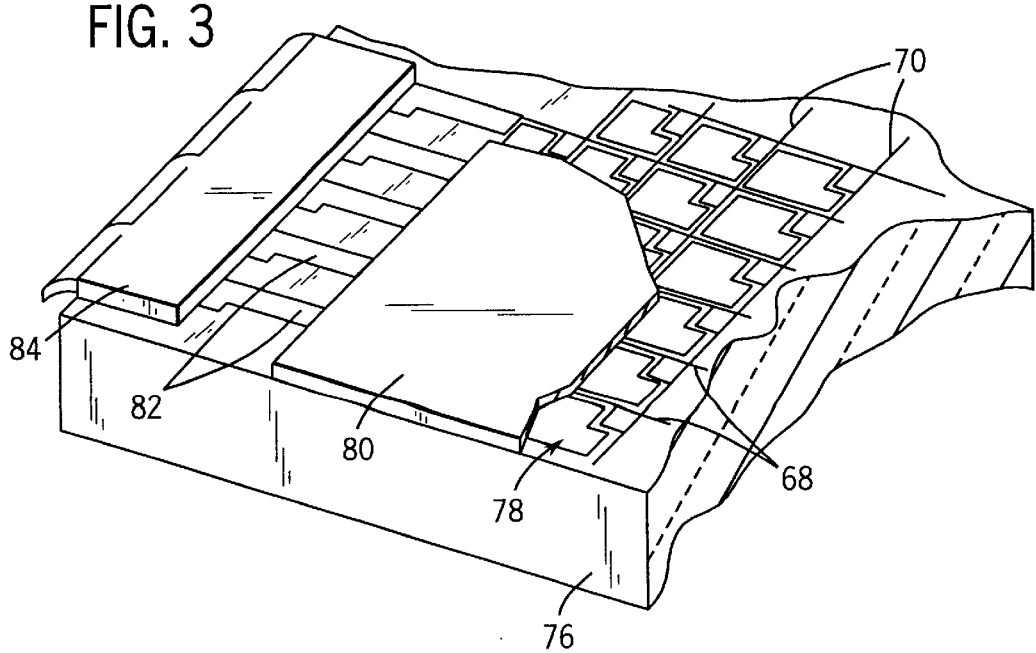
FIG. 3 is a partial sectional view illustrating an exemplary detector structure for producing the image data.

FIG. 3 generally represents an exemplary physical arrangement of the components illustrated diagramatically in FIG. 2. As shown in FIG. 3, the detector may include a glass substrate 76 on which the components described below are disposed. Column electrodes 68 and row electrodes 70 are provided on the substrate, and an amorphous silicon flat panel array 78 is defined, including the thin film transistors and photodiodes described above. A scintillator 80 is provided over the amorphous silicon array for receiving radiation during examination sequences as described above. Contact fingers 82 are formed for communicating signals to and from the column and row electrodes, and contact leads 84 are provided for communicating the signals between the contact fingers and external circuitry.

It has been found that in digital x-ray imaging and viewing systems such as that described above, particular problems may arise in viewing or otherwise outputting images on displays 30 or operator workstations 32 which have different dynamic ranges from the image data acquisition components of the system. For example, in a present embodiment of a digital x-ray imaging system, image data acquisition components have a dynamic range of 12 bits, while displays have a reduced dynamic range of 8 bits. Thus, each pixel of the image matrix may be represented in the acquired and stored image data by a series of binary values 12 bits long. In the reconstructed image, if appropriate correction or accommodation is not made for the dynamic range of the display or output device, certain regions of the reconstructed image may appear very dark, while other regions may appear very bright. In either case, desired contrast and discernible details may be lost, or may not be distinguishable by the user. This is particularly the case in chest x-rays, where lung regions may appear very bright, while contrast in darker regions is reduced, particularly in regions of the heart.

The present technique provides a mechanism for adjusting the image data acquired or stored in an imaging system to accommodate output or display devices. In a presently contemplated embodiment, the technique is carried out based upon appropriate programming code stored within a system controller 28, operator workstation 32 (see FIG. 1) or a similar component of the image acquisition or image viewing system. The programming code may be part of an overall image acquisition or image viewing routine, or may be executed upon command automatically or by request of an operator, such as a radiologist viewing images at a workstation 32. Moreover, the programming code implementing the present technique may be supported on any suitable medium, such as magnetic storage devices, optical storage devices, random access memory, read only memory, and so forth. Also, the code may be loaded on to the machine readable medium through any suitable process, such as over a configurable or open network, or via a proprietary network.

In accordance with the present technique, original image data is processed in several subsequent steps to obtain output data for display or image reconstruction. In general, the technique reduces pixel values in bright portions of the image, while avoiding reducing contrast or saturating darker portions of the image. The presently preferred algorithm controls two sets of parameter values for unsharp masking and brightness control. As a result, brightness may be varied between pure gray level processing, in which case contrast may be severely limited, and pure frequency processing, in which case "ringing" artifacts may be produced.

Referring more specifically now to the preferred processing technique, as a first step in the process, original image data is accessed from a memory circuit, such as a memory or archive of system controller 22, or other storage device. It should be noted that this original image data set may consist of raw data or partially processed data. The data will consist of code representative of each pixel in the image matrix, having a value which may vary over the dynamic range of the image acquisition and processing components. These values are converted to output values in accordance with the relationship:

$$\text{Out} = \text{GAMMALUT}(\text{In} - \text{BOOSTLUT}(\text{Smooth}) * \text{Smooth}) \quad (\text{eq.1});$$

where In is the value of an input pixel, and Out is the output value for the same pixel. The other parameters of eq. 1 are described in greater detail below.

The processing implied by equation 1 may be based upon an input or initial image data set in which the pixel values have been scaled such that a mean value is fixed through an automatic brightness control window or similar user-adjustment technique. This initial data set is then smoothed via a boxcar smoothing technique to obtain a set of image values referred to in equation 1 as Smooth. As will be appreciated by those skilled in the art, this smoothing operation functions generally as a low-pass filtering process in which individual pixel values are assigned new values derived from their original value and values of neighboring pixels. In the present technique, any suitable smoothing procedure may be employed, and any suitable boxcar filter size may be used.

Figure 4:
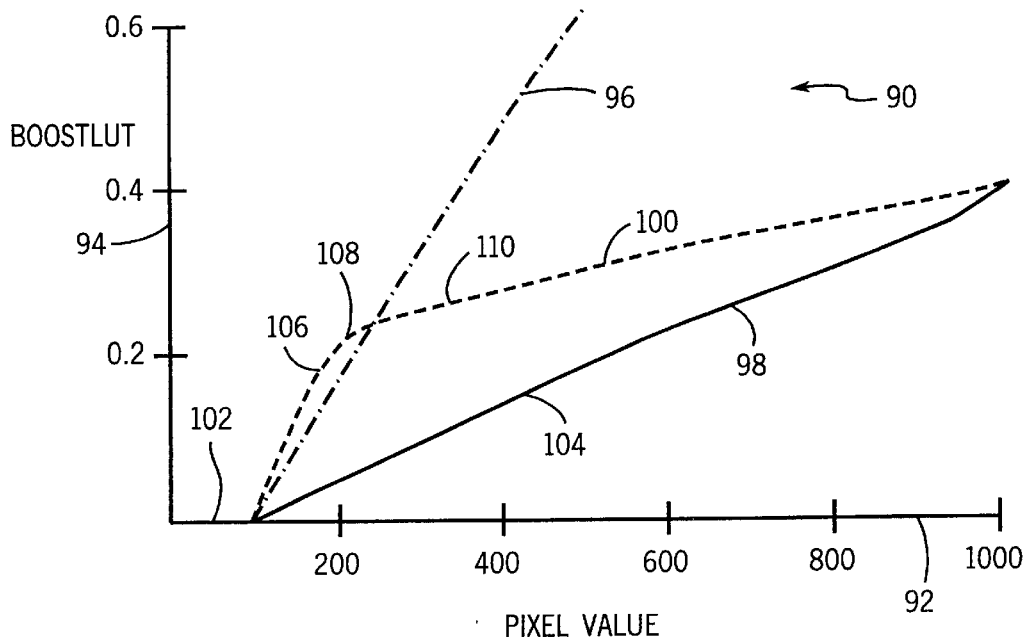
FIG. 4 is a graphical representation of exemplary values for unsharp masking of image data in accordance with the present technique.

Parameter values or sets, denoted BOOSTLUT and GAMMALUT in eq. 1, are used in the present technique to perform unsharp masking and brightness control operations. In particular, BOOSTLUT consists of a lookup table which controls the amount of unsharp masking as a function of signal level. As described below, in a present embodiment, the function for BOOSTLUT is preferably such that the unsharp masking value is zero below a threshold pixel value (i.e. no unsharp masking is performed below this threshold) and increases monotonically above the threshold. The parameter set GAMMALUT is a similar lookup table which rolls off the bright portions of the image. In a present embodiment, the values of GAMMALUT define a linear function below a defined threshold and has an output-to-input relationship of $y=x^\gamma$ above the threshold, where Y has a value between zero and one As noted above, the values of BOOSTLUT and GAMMALUT are preferably determined to provide a balance between pure gray level processing and pure frequency processing. While specific systems will generally require such determination empirically, exemplary values for these parameters are illustrated as a function of pixel value in FIGS. 4 and 5. In particular, FIG. 4 illustrates a series of BOOSTLUT values or relationships, with pixel values being defined along a horizontal axis 92, and BOOSTLUT values being defined along a vertical axis 94. A series of traces 96, 98 and 100 define the relationships between these input and output values. It should be borne in mind that in accordance with equation 1, the value selected of BOOSTLUT is preferably based upon the smoothed pixel values produced earlier in the processing.

Trace 96 represents values initially employed in a prototype system. In the prototype system, smoothing kernel sizes of between 25×25 and 151×151 were used for smoothing the image data. The values of BOOSTLUT were provided such that this unsharp masking of value was zero below a threshold of 100 counts (smooth pixel intensity value), and increased linearly with a slope of $1.8 \times 10^{-3}$ above the threshold.

Trace 98 represents alternative values for BOOSTLUT used in fluoroscopic images. In this example, the values of BOOSTLUT remained at a zero level with pixel values lower than 100 counts, and then rose linearly as indicated at reference numeral 104 in FIG. 4, with a slope of $5 \times 10^{-4}$. In this second operation, a smoothing kernel of 75×75 was employed.

Trace 100 in FIG. 4 illustrates a third alternative function for BOOSTLUT used to reduce the darkening of regions in lung portions of a chest x-ray. In this embodiment, the values of BOOSTLUT were modified to reduce the strength of unsharp masking at high pixel values, while increasing it at moderate pixel values. Thus, the BOOSTLUT function again had a threshold of 100 counts, below which the BOOSTLUT values were zero. Above the threshold, however, the values of BOOSTLUT increased at a relatively high rate in an initially rising portion 106, to a transition region 108. Thereafter, the values of BOOSTLUT were increased as a function of the pixel values, but at a reduced rate as indicated by reference numeral 110 in FIG. 4.

Figure 5:
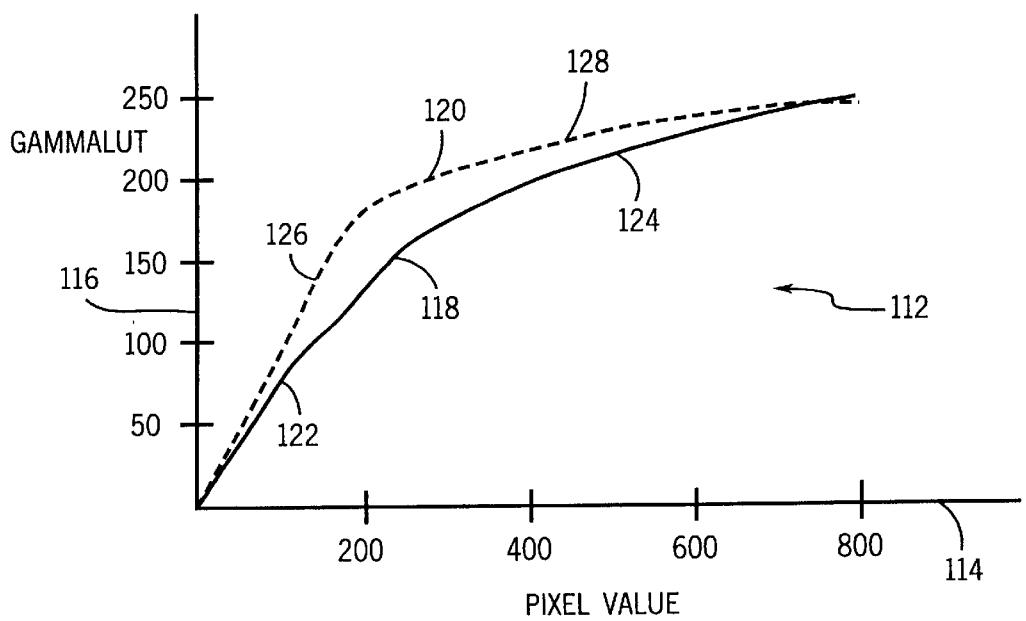
FIG. 5 is a graphical representation of values for brightness control of unsharp masked pixel values in accordance with the present technique.

FIG. 5 illustrates exemplary values for GAMMALUT used in the present technique and in application of the relationship defined by equation 1. These values are provided by relationships designated generally by reference numeral 112 in FIG. 5, again presented graphically with pixel values being scaled along axis horizontal 114, and GAMMALUT values being indicated by vertical axis 116.

In an initial prototype, corresponding to the BOOSTLUT values defined by trace 96 in FIG. 4, GAMMALUT values were defined by the relationship:

$$y = \begin{cases} mx & x < b/m \\ b\left(1 - \gamma^{\gamma/(1-\gamma)} + \left(\frac{mx}{b} - 1 + \gamma^{1/(1-\gamma)}\right)^\gamma\right) & b/m < x < 255; \end{cases} \quad \text{(eq. 2)}$$

where y is the value of GAMMALUT, x is the input pixel value, m and b are empirical parameters, set in the example to values of 1 and 140, respectively, and Y is a value adjusted such that an output count of 255 is reached at 9 times a display optimum of 90 counts. As may be observed, the function is linear with a slope m below a threshold of b/m and rolls off smoothly to a maximum value of 255 at a value of x which depends on Y.

In a subsequent embodiment, corresponding to the BOOSTLUT trace 98, the values of GAMMALUT were provided as indicated by trace 118 in FIG. 5. In this embodiment, an initial region 122 increases with pixel values at an initial rate, and this rate of increase is progressively reduced in a subsequent region 124.

FIG. 5 also illustrates exemplary values for GAMMALUT which were employed in an embodiment in which the values of BOOSTLUT are indicated by trace 100 in FIG. 4. In this embodiment, the values of GAMMALUT followed the original GAMMALUT relationship defined by equation 2, but the slope of an initial linear portion, indicated by reference numeral 126 in FIG. 5, was reduced slightly to reduce the display signal level by about 2% (i.e. m is changed to 0.978 in equation 2).

The foregoing technique was employed for images on a series of different patients. Each patient typically had two record and two fluoroscopic sequences performed on a digital x-ray imaging system. Each sequence included several hundred images. Images processed in accordance with the foregoing technique served as the basis for blind comparison tests by radiologists, and provided excellent results, both in maintaining appropriate levels of intensity in light and dark regions of the images, and in maintaining detail by contrast.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing digital image data in a discrete pixel imaging system, the method comprising the steps of:

accessing a set of input data including a plurality of input data values for a corresponding plurality of pixel locations in an image matrix;

smoothing the input data values with adjacent input data values of the image matrix;

generating an unsharp masking value for each pixel by multiplying the smoothed input data value, by an unsharp masking parameter and determining a difference between the resulting value for each pixel and a corresponding pixel from the set of input data; and generating an output value for each pixel based upon the unsharp masking values and a set of brightness control parameters.

2. The method of claim 1, wherein the unsharp masking parameter is a function of the smoothed data value.

3. The method of claim 1, wherein the unsharp masking parameter has a value substantially equal to zero below a threshold smoothed data value and increases monotonically above the threshold value.

4. The method of claim 3, wherein the unsharp masking parameter increases non-linearly above the threshold value.

5. The method of claim 1, wherein the brightness control parameter is a function of the input data value.

6. The method of claim 5, wherein the brightness control parameter increases non-linearly with increasing input data values.

7. The method of claim 1, wherein the input data values have a first dynamic range and the output values have a second dynamic range smaller than the first dynamic range, and wherein the unsharp masking parameter and the brightness control parameter map the first dynamic range onto the second dynamic range.

8. The method of claim 1, wherein the input data is acquired from a digital x-ray detector configured to receive radiation from a source of x-ray radiation, and to generate the input data values for each pixel based upon radiation received at locations of each pixel within the image matrix.

9. A method, for converting image data signals from a first dynamic range to a second dynamic range, the method comprising the steps of:

accessing a set of input data values for pixels of an image matrix, the input data values having a first dynamic range;

generating a smoothed data value for each pixel;

generating an unsharp masking value for each pixel by multiplying the smoothed data value by an unsharp masking parameter and determining the difference between the resulting value and the input data value; and generating an output value for each pixel having a second dynamic range by multiplying the unsharp masking value by a brightness control parameter.

10. The method of claim 9, wherein the first dynamic range is larger than the second dynamic range.

11. The method of claim 10, wherein the first dynamic range is a 12 bit range and the second dynamic range is an 8 bit range.

12. The method of claim 9, comprising the further step of acquiring the set of input data values in an examination sequence.

13. The method of claim 12, wherein the set of input data is acquired from a digital x-ray detector.

14. The method of claim 9, wherein the unsharp masking parameter is a function of the smoothed data value.

15. The method of claim 9, wherein the unsharp masking parameter has a value substantially equal to zero below a threshold smoothed data value and increases monotonically above the threshold value.

16. The method of claim 15, wherein the unsharp masking parameter increases non-linearly above the threshold value.

17. The method of claim 9, wherein the brightness control parameter is a function of the input data value.

18. The method of claim 17, wherein the brightness control parameter increases non-linearly with increasing input data values.

19. A system for displaying an image reconstructed from digital image data, the system comprising:

a data storage device for storing an image data set for pixels of an image, the image data set having a first dynamic range;

a display device having a second dynamic range different from the first dynamic range;

a data processing device configured to access the image data set from the data storage device, to smooth data values for the pixels of the data set, to generate unsharp masking values from the smoothed data values by multiplying the smoothed data value for each pixel by an unsharp masking parameter and determining a difference between the resulting value for each pixel and a corresponding pixel value from the image data set, and to generate output values from the unsharp masking values, the output values conforming to the second dynamic range.

20. The system of claim 19, wherein the unsharp masking parameter is a function of the smoothed data values.

21. The system of claim 20, wherein the unsharp masking parameter has a value substantially equal to zero below a threshold smoothed data value and increases monotonically above the threshold value.

22. The system of claim 21, wherein the unsharp masking parameter increases non-linearly above the threshold value.

23. The system of claim 19 wherein the output values are generated by multiplying the unsharp masking value for each pixel by a brightness control parameter.

24. The system of claim 23, wherein the brightness control parameter is a function of the image data set values.

25. The system of claim 24, wherein the brightness control parameter increases non-linearly with increasing image data set values.

26. The system of claim 19, further comprising an image acquisition system for generating the image data set.

27. The system of claim 26, wherein the image acquisition system includes an x-ray source and a digital x-ray detector.

28. The system of claim 19, wherein the first dynamic range is larger than the second dynamic range.

29. The system of claim 28, wherein the first dynamic range is a 12 bit range, and the second dynamic range is an 8 bit range.

30. A computer program for processing image data, the computer program comprising:

a machine readable medium for storing programming code; and programming code stored on the machine readable medium, the programming code providing instructions for a signal processing circuit of an imaging system for accessing an image data set from a data storage device, smoothing data values for pixels encoded in the data set, generating unsharp masking values from the smoothed data values by multiplying the smoothed data value for each pixel by an unsharp masking parameter and determining a difference between the resulting value for each pixel and a corresponding pixel value from the image data set, and generating output values from the unsharp masking values for display, the output values having a desired dynamic range different from an initial dynamic range of the data set.

31. The computer program of claim 30, wherein the unsharp masking parameter is a function of the smoothed data values.

32. The computer program of claim 31, wherein the unsharp masking parameter has a value substantially equal to zero below a threshold smoothed data value and increases monotonically above the threshold value.

33. The computer program of claim 32, wherein the unsharp masking parameter increases non-linearly above the threshold value.

34. The computer program of claim 30, wherein the output values are generated by multiplying the unsharp masking value for each pixel by a brightness control parameter.

35. The computer program of claim 34, wherein the brightness control parameter is a function of the image data set values.

36. The computer program of claim 35, wherein the brightness control parameter increases non-linearly with increasing image data set values.

37. The computer program of claim 30, wherein the machine readable medium is a resident component of an imaging system.

38. The computer program of claim 30, wherein the programming code is transferred to the machine readable medium via a configurable network connection.

* * * * *